(12) United States Patent
Dahlstedt et al.

(10) Patent No.: US 8,024,505 B2
(45) Date of Patent: Sep. 20, 2011

(54) SYSTEM AND METHOD FOR OPTIMISTIC CREATION OF THREAD LOCAL OBJECTS IN A VIRTUAL MACHINE ENVIRONMENT

(75) Inventors: Joakim Dahlstedt, Stockholm (SE); Henrik Osterdahl, Stockholm (SE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 11/745,830

(22) Filed: May 8, 2007

(65) Prior Publication Data

US 2008/0021939 A1    Jan. 24, 2008

Related U.S. Application Data

(60) Provisional application No. 60/799,565, filed on May 11, 2006, provisional application No. 60/799,516, filed on May 11, 2006.

(51) Int. Cl.
    *G06F 12/02* (2006.01)
(52) U.S. Cl. .............. 711/6; 711/165; 711/E12.011; 707/820
(58) Field of Classification Search .......... 707/206, 707/999.206, 813; 711/6, 159, E12.011, 711/E12.012
See application file for complete search history.

(56) References Cited

U.S. PATENT DOCUMENTS

| | | | | |
|---|---|---|---|---|
| 6,507,903 B1* | 1/2003 | Beatty et al. | ............... | 711/173 |
| 6,539,464 B1* | 3/2003 | Getov | ............... | 711/170 |
| 6,832,228 B1* | 12/2004 | Nock | ............... | 707/103 R |
| 6,907,437 B1 | 6/2005 | Trotter | | |
| 6,912,553 B1* | 6/2005 | Kolodner et al. | ............. | 707/206 |
| 6,971,097 B1* | 11/2005 | Wallman | .............. | 718/101 |
| 7,092,978 B2* | 8/2006 | Garthwaite | ............. | 707/206 |
| 7,206,890 B2* | 4/2007 | Mathiske | ............... | 711/6 |
| 7,954,100 B1* | 5/2011 | Garthwaite | ............. | 718/100 |
| 2002/0055941 A1* | 5/2002 | Kolodner et al. | ............. | 707/200 |
| 2002/0095453 A1* | 7/2002 | Steensgaard | ............. | 709/107 |
| 2002/0099765 A1* | 7/2002 | Otis | ............. | 709/203 |
| 2002/0107879 A1 | 8/2002 | Arnold et al. | | |
| 2003/0097537 A1* | 5/2003 | Bollella et al. | ............. | 711/170 |
| 2003/0220952 A1 | 11/2003 | Borman et al. | | |
| 2004/0250041 A1* | 12/2004 | Sollich | ............. | 711/170 |
| 2005/0086658 A1* | 4/2005 | Wilding et al. | ............. | 718/104 |
| 2007/0162528 A1* | 7/2007 | Wright et al. | ............. | 707/206 |
| 2008/0195681 A1* | 8/2008 | Daynes et al. | ............. | 707/206 |

OTHER PUBLICATIONS

Berger, Emery David. "Memory Management for High-Performance Applications." Aug. 2002. ProQuest. pp. 26, 33, 82-85, 90-94, and 121-122.*

Flood, Christine H., David Detlefs, Nir Shavit, and Xiaolan Zhang. "Parallel Garbage Collection for Shared Memory Multiprocessors.", Apr. 2001. USENIX JVM Conference.*

(Continued)

*Primary Examiner* — Reginald Bragdon
*Assistant Examiner* — Nathan Sadler
(74) *Attorney, Agent, or Firm* — Fliesler Meyer LLP

(57) ABSTRACT

A system for thread local garbage collection in a virtual machine environment, comprising: a virtual machine for executing a software application; a memory space for use by the virtual machine in storing software objects and pointers as part of the software application, divided into a global heap and several thread local heaps; a heap maintaining logic that keeps the global heap and the thread local heaps in a state suitable for efficient garbage collecting; and a garbage collector that can collect the thread local heaps in parallel with only the stop-the-world pauses for the global heap.

18 Claims, 5 Drawing Sheets

OTHER PUBLICATIONS

Steensgaard, Bjarne. "Thread-Specific Heaps for Multi-Threaded Programs." 2000. ISMM '00. ACM.*

Michael, Maged M. "Scalable Lock-Free Dynamic Memory Allocation." Jun. 2004. PLDI '04. ACM.*

Domani, Tamar, Gal Goldshtein, Elliot K. Kolodner, Ethan Lewis, Erez Petrank, and Dafna Sheinwald. "Thread-Local Heaps for Java." Jun. 2002. ISMM '02. ACM.*

"Java 2 Platform Std. Ed. v1.3.1." 2001. Sun Microsystems. http://java.sun.com/j2se/1.3/docs/api/java/lang/System.html. pp. 1-2, 12-13, and 15.*

Damien Doligez and Georges Gonthier. "Portable, Unobtrusive Garbage Collection for Multiprocessor Systems." 1994. ACM. POPL 1994. pp. 70-83.*

Damien Doligez and Xavier Leroy. "A concurrent, generational garbage collector for a multithreaded implementation of ML." 1993. ACM. POPL 1993. pp. 113-123.*

Kai Li and Paul Hudak. "Memory Coherence in Shared Virtual Memory Systems." 1989. ACM. ACM Transactions on Computer Systems. vol. 7. No. 4. pp. 321-359.*

PCT International Search Report dated Jul. 22, 2008 in connection with PCT Application No. PCT/US07/68686, 7 pages.

* cited by examiner

SYSTEM AND METHOD FOR OPTIMISTIC CREATION OF THREAD LOCAL OBJECTS IN A VIRTUAL MACHINE ENVIRONMENT

CLAIM OF PRIORITY

This application claims the benefit of U.S. Provisional Patent Applications "SYSTEM AND METHOD FOR OPTIMISTIC CREATION OF THREAD LOCAL OBJECTS IN A VIRTUAL MACHINE ENVIRONMENT", Application No. 60/799,565, filed May 11, 2006; and "SYSTEM AND METHOD FOR OPTIMISTIC CREATION OF THREAD LOCAL OBJECTS IN A VIRTUAL MACHINE ENVIRONMENT", Application No. 60/799,516, filed May 11, 2006; each of which applications are hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to virtual machine environments and other run-time environments, and in particular to object allocation and garbage collection within such a environment.

BACKGROUND

Virtual machines are abstract computers for which application software can be compiled. The virtual machine is thus an abstraction level for application software that is consistent between different hardware and operating system combinations. Most of the complexity in running the same application on different platforms is handled by the virtual machine and therefore the virtual machine becomes a very complex piece of software. Modern virtual machines need to manage code generation for the particular processor, operating system dependent resources like threads, networking and the file system. The virtual machine also manages the heap, within which allocation and freeing of virtual machine objects is performed. Examples of such virtual machines include the Java Virtual Machine (JVM) and implementations thereof, including the JRockit JVM from BEA Systems Inc., and the Hotspot JVM from Sun Microsystems, Inc.

The definition of the Java Virtual Machine (JVM) does not specify any requirements on the performance or the behaviour of the garbage collection process apart from basic assumptions such as: unused memory should be reused for new objects, and finalizers should be called when objects are to be released. The exact details are explained in the book "The Java™ Virtual Machine Specification (2nd Edition)" by Tim Lindholm published by Sun, and incorporated herein by reference. The JVM implementor can therefore choose to optimize different kinds of behaviours depending on the requirements of the application software and the features of the particular hardware used. A perfect garbage collector would be undetectable to the application software and the software user, there would be no pauses, no extra CPU or memory consumption. Unfortunately no such garbage collector exists and a lot of work has been invested into achieving high performance object allocation and garbage collection with different algorithms for different goals.

Two of the more important problems to solve within garbage collection is to lower the pause times and to increase pause predictability. Pause times include both stop-the-world times where all threads are stopped simultaneously while the garbage collector performs some work, and pause times for each thread separately. Stop-the-world pauses are more disruptive to application software than separate thread pauses. However the sum of all pauses must be limited to allow the application to perform efficiently. For many applications pause predictability is more important than efficiency. Efficiency, to a certain limit can be achieved by purchasing more powerful hardware, but predictable pause times cannot simply be achieved by providing faster hardware.

Object allocation is the companion problem to garbage collection. To avoid locking bottlenecks the standard solution is to give each thread its own thread local area (TLA) on the heap where allocation is performed by pointer bumping. When the TLA is used up, a global free list lock is needed to secure a new TLA for the thread. Since a TLA is simply an area on the heap where only a single thread is allowed to allocate, the objects allocated are immediately eligible for garbage collection if necessary.

Since stop-the-world pauses are undesirable, much work has been spent on ways of splitting the garbage collector work into manageable units, where each unit of work incurs a short pause time, especially that work which requires a stop-the-world pause. Examples of such solutions are concurrent garbage collectors, generational garbage collectors and thread local garbage collectors.

The concurrent garbage collector performs as much as possible of the garbage collecting process in parallel with the software application. To do this the JVM needs to trap all updates to pointers while the garbage collector is running. This is called a "write barrier", and costs cpu-time. The concurrent garbage collector is therefore used when short pause times are more important than efficiency.

The generational garbage collectors allocate objects within a nursery heap. Objects surviving the nursery collection are assumed to be long-lived objects and therefore moved to the old space on the heap which is collected more seldom. The increase in efficiency is based on the assumption that objects die young and it is faster for the garbage collector to collect the small nursery heap to avoid a full collect of the larger old space heap. The generational garbage collector also needs write barriers.

The thread local garbage collector splits the heap into one large global heap and one small local heap for each thread in such a way that each thread local heap can be garbage collected separately from the other thread local heaps. Thread local heaps can potentially increase efficiency both by avoiding collecting the global heap and by lowering the pause times for each thread and to reduce the number of stop-the-world pauses. U.S. Pat. No. 6,912,553 (Kolodner, et al.) teaches a thread local heap collector that traps each update to object pointers in such a way that any object that can be accessed by a thread different from the given thread, will be moved to the global heap. The traps are implemented as software write barriers generated for JVM byte code instructions putfield, putstatic and aastore. Unfortunately, in current thread local heap implementations the gain in garbage collector performance is lost due to the write barriers needed and to the cost of moving objects from the local heap to the global heap.

SUMMARY

Disclosed herein is a system and method for thread local garbage collection in a virtual machine (VM), or other runtime environment, and particularly for use in a system that includes a Java Virtual Machine (JVM). As described above, thread local garbage collection is worth the effort because of the increased concurrency and thus shorter pause times. Unfortunately current techniques used for thread local garbage collection are not efficient enough to justify the increase in concurrency.

In accordance with an embodiment, the system addresses this problem by providing a system and method to maintain and garbage collect thread local heaps efficiently, improve cache locality, reduce locking costs and improve the performance of transaction based services. In accordance with an embodiment, the invention provides a system for thread local garbage collection in a virtual machine environment, comprising: a virtual machine for executing a software application; a memory space for use by the virtual machine in storing software objects and pointers as part of the software application, divided into a global heap and several thread local heaps; heap maintaining logic that keeps the global heap and the thread local heaps in a state suitable for efficient garbage collecting, i.e. thread local objects are not referenced from other thread execution contexts or other thread local heaps; and a garbage collector that can collect the thread local heaps in parallel with only the stop-the-world pauses for the global heap.

DETAILED DESCRIPTION

Disclosed herein is a system and method for thread local garbage collection in a virtual machine (VM), or other runtime environment, and particularly for use in a system that includes a Java Virtual Machine (JVM). As described above, thread local garbage collection is worth the effort because of the increased concurrency and thus shorter pause times. Unfortunately current techniques used for thread local garbage collection are not efficient enough to justify the increase in concurrency.

An embodiment of the present invention addresses this problem by providing a system and method to maintain and garbage collect thread local heaps efficiently, improve cache locality, reduce locking costs and improve the performance of transaction based services. In accordance with an embodiment, the system allows for thread local garbage collection in a virtual machine environment, comprising: a virtual machine for executing a software application; a memory space for use by the virtual machine in storing software objects and pointers as part of the software application, divided into a global heap and several thread local heaps; heap maintaining logic that keeps the global heap and the thread local heaps in a state suitable for efficient garbage collecting; and a garbage collector that can collect the thread local heaps in parallel with only the stop-the-world pauses for the global heap.

In accordance with another embodiment, thread local objects are not referenced from other thread execution contexts or other thread local heaps.

In accordance with another embodiment, the size of a thread local heap can start small and increase as the software application uses more thread local objects.

In accordance with another embodiment, the thread local heaps is divided into a local young space and local old space.

In accordance with another embodiment, in cases of object access that require locking to protect the internal structure of the object, the JVM can avoid costly locking procedures if the object is located in a thread local heap.

In accordance with another embodiment, the software application can issue a command to the JVM to trigger the JVM to perform a thread local garbage collect.

Figure 1:
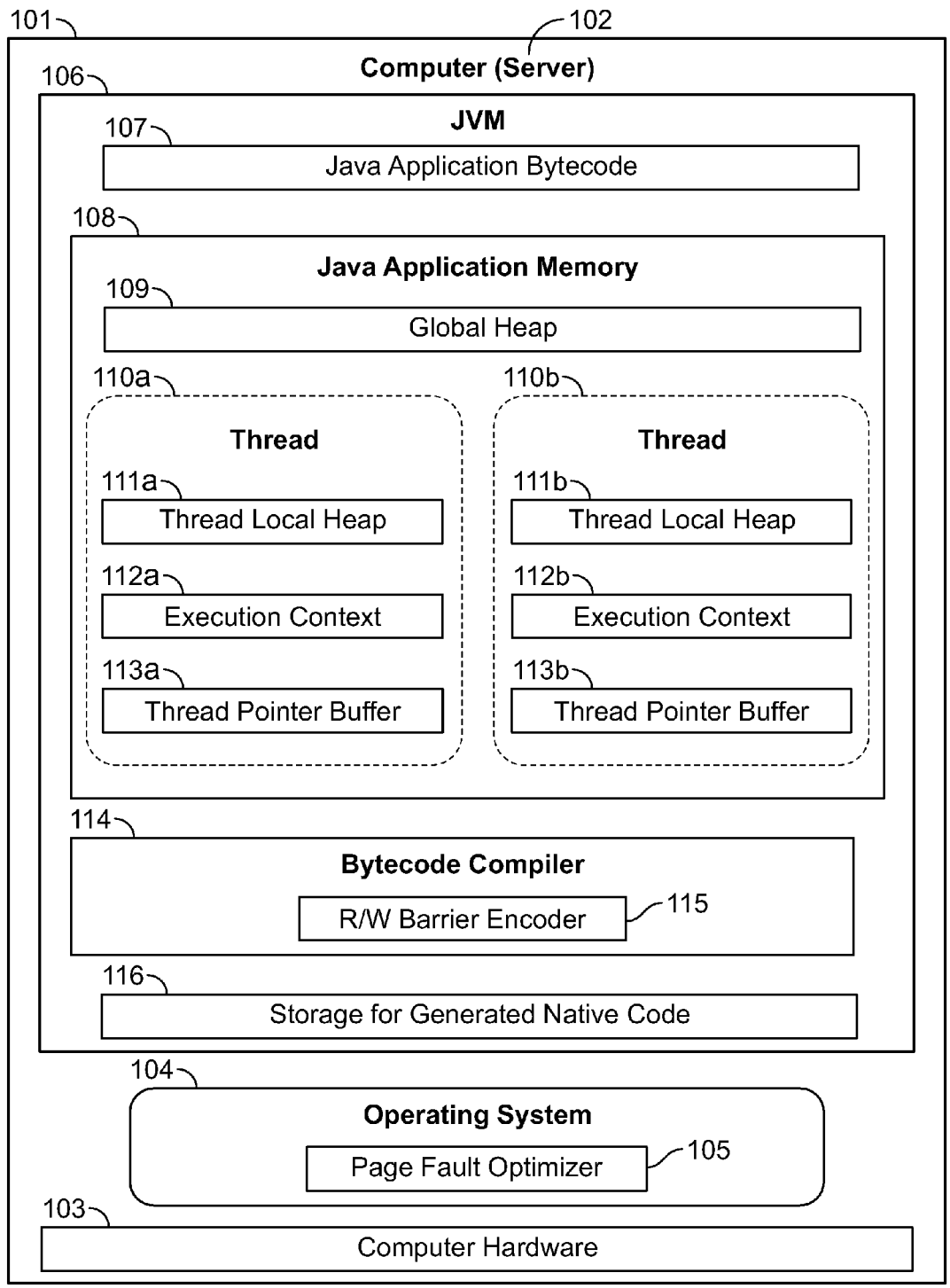
FIG. 1 shows an illustration of a system in accordance with an embodiment, that uses thread local heaps in combination with a global heap.

FIG. 1 shows an illustration of a system in accordance with an embodiment, that uses thread local heaps in combination with a global heap. As shown in FIG. 1, the system 101 comprises a computer server 102 that further comprises a computer hardware 103. The computer hardware is running an operating system 104 and the operating system has a module to detect page faults efficiently 105. Normally, page faults are assumed to be an error in processing the application software and current operating systems are therefore allowed to spend a considerable time processing page faults. In accordance with an embodiment, page faults are an integral part of the system and for this a page fault optimizer is necessary to achieve efficient processing. The page fault optimizer enables separate threads within a process to have pages in memory that will cause page faults when read or written from other threads within the same process. This is also not available in current operating systems.

A virtual machine such as a Java Virtual Machine 106 runs within the operating system. The JVM contains the application software as byte code 107. When the application software is running it makes use of the Java application memory 108 which contains the global heap 109 in which Java objects used by the application are stored. The application memory also contains the threads 110a and 110b running within the application. A thread has a local heap 111a which contains the Java objects that have not been accessed by any other thread. To garbage collect the thread local heap 111a, the garbage collector scans the execution context 112a to find pointers to live objects within the thread local heap. The execution context contains the current registers of the thread and the thread stack. To find objects that are live, but only referenced from the global heap 109, a thread pointer buffer 113a can be used. The thread pointer buffer 113a contains pointers to all object variables in the global heap 109 that point to Java objects inside the thread local heap 111a. All objects in the thread local heap 111a referenced from the thread pointer buffer 113a are live, because they are thus referenced from the global heap 109.

It is only possible to garbage collect the thread local heap 111a separately from the global heap 109 and other thread local heaps 111b as long as no pointers to Java objects within the thread local heap 111a are stored neither within thread local heap 111b nor its execution context 112b. In accordance with an embodiment, the system maintains this invariant by promoting Java objects from the thread local heaps to the global heap as soon as a Java object in a thread local heap 111a is accessed from a different thread 110b.

In accordance with an embodiment, the system uses the page fault optimizer 105 to detect when Java objects belonging to other threads are accessed, but it also needs assistance from the byte code compiler 114 to keep the thread pointer buffer 113a, 113b up to date. To do this the byte code compiler needs assistance from the write barrier encoder 115. The generated native code for the software application, together with the write barrier instructions, are stored in 116.

Figure 2:
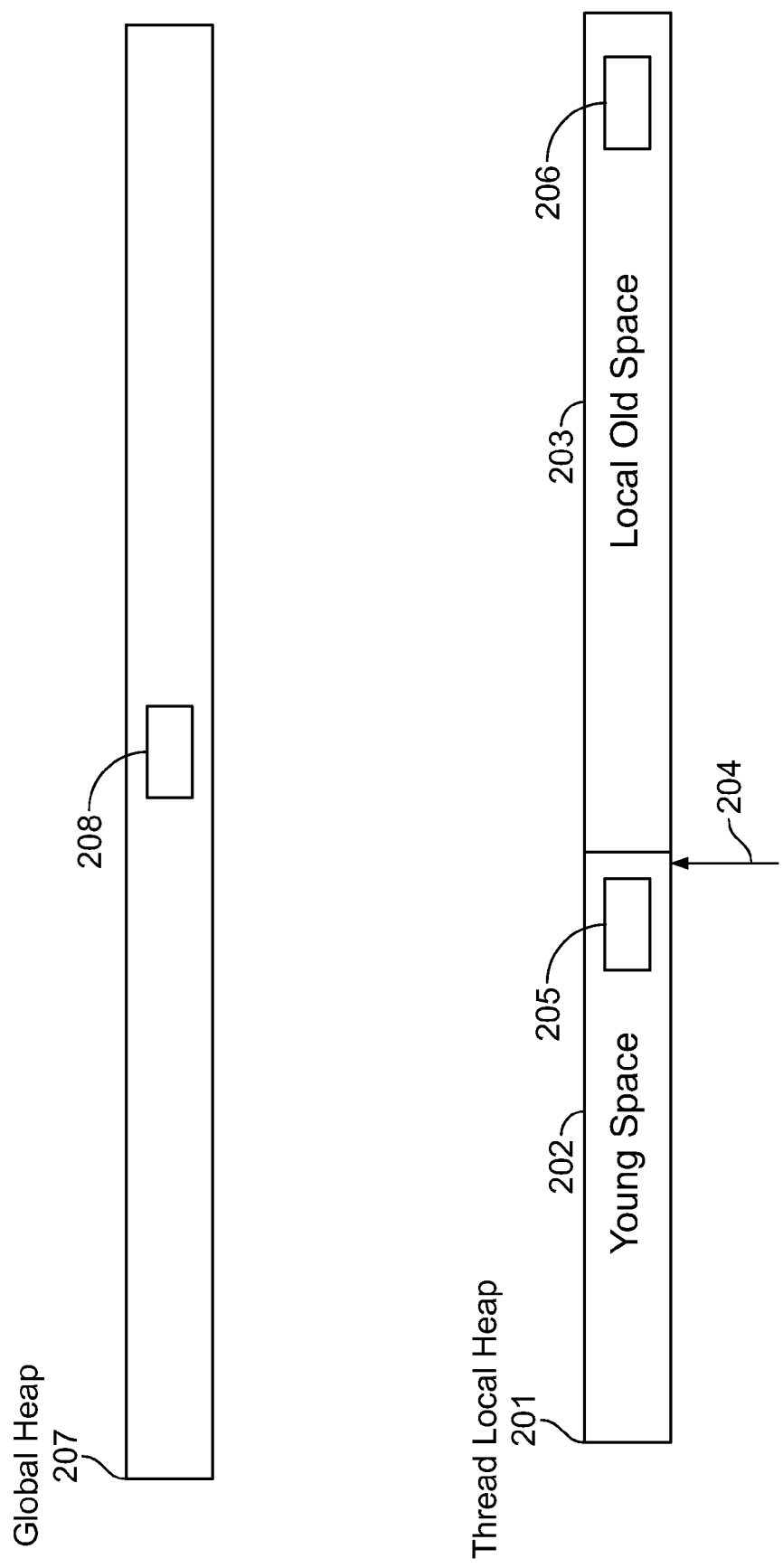
FIG. 2 shows a schematic of the memory layout in accordance with an embodiment, for a thread local heap with a local nursery and a local old space.

FIG. 2 shows a schematic of the memory layout in accordance with an embodiment, for a thread local heap with a local nursery and a local old space and its thread pointer buffer. As shown in FIG. 2, the thread local heap 201 is divided into a local nursery 202 and a Local Old Space 203. A pointer 204, points to the first unused address inside the local nursery 202. A newly allocated object 205 is placed at the position of this pointer. The pointer is then increased with the size of the newly allocated object, so the pointer points just after the new object. When the whole local nursery is used, all live objects within the local nursery are promoted to the local old space 203 and the pointer 204 is reset to the beginning. To do this, a full garbage collect of the thread local heap is necessary. Assuming that object 205 is live, it will be copied to location 206 in the local old space 203. If object 206 is accessed from a second thread different from the first thread that owns the thread local heap, the object must be moved to the global heap 207, for example to location 208 (e.g. the object is copied from the thread local heap to the global heap). The second accessing thread can now safely store the address to the object 208 in its thread execution context or thread local heap, since it is no longer thread local to the first thread. The size of the local nursery 202 inside the thread local heap 201 should not be larger than some level cache of the processor. This is to allow the cache to reuse the same already cached memory addresses as much as possible and achieve a boost in performance. Locking costs can be reduced for objects that are located on the thread local heap 201 and that need synchronization to protect their internal data structure from concurrent modifications, since all objects on the thread local heap 201, can by definition only be used by a single thread.

Figure 3:
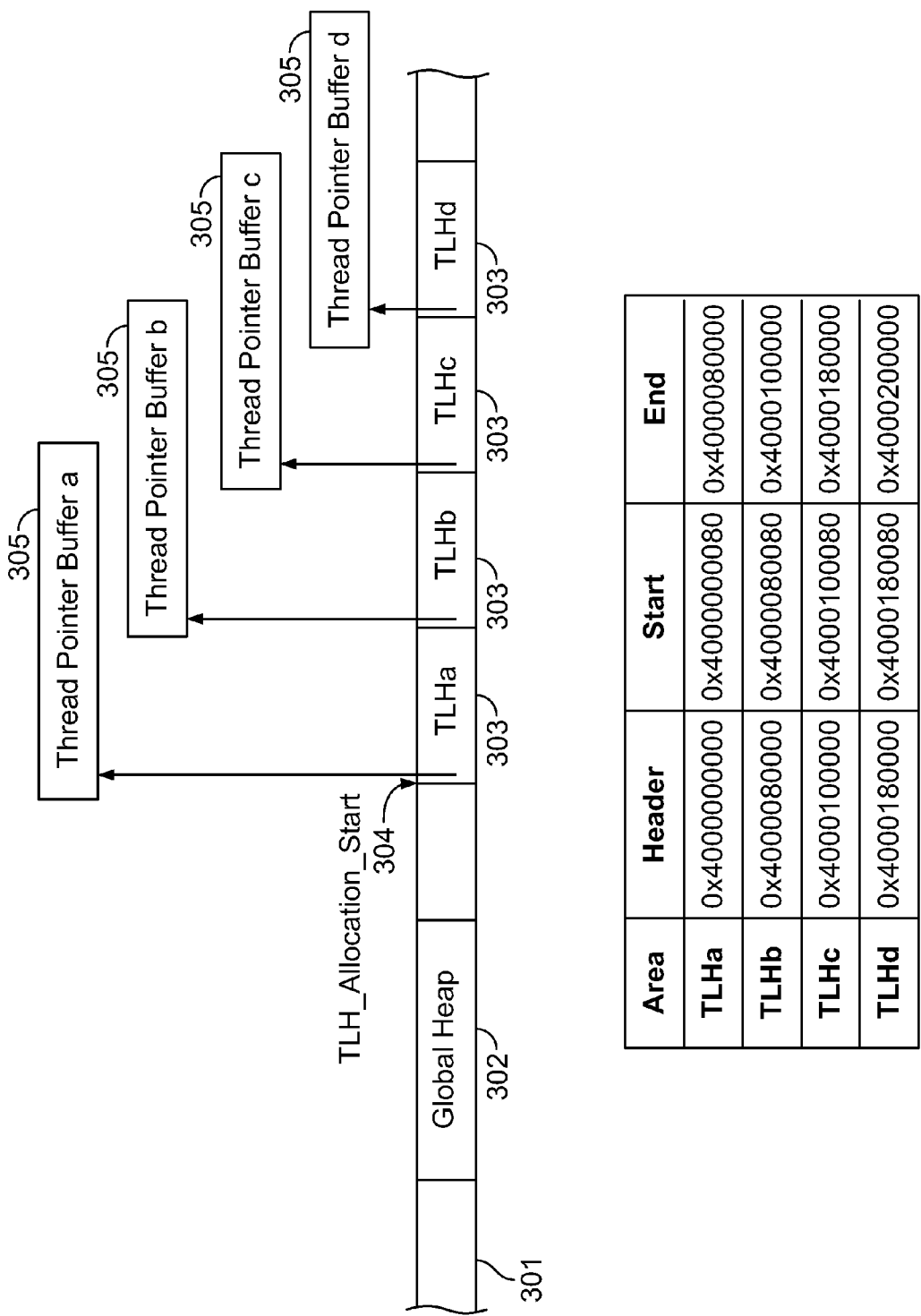
FIG. 3 shows a schematic of the memory layout in accordance with an embodiment, that enables efficient read and write barrier implementations.

FIG. 3 shows a schematic of the memory layout in accordance with an embodiment that enables efficient read and write barrier implementations. As shown in FIG. 3, the Java application memory 301 contains the global heap 302 and the thread local heaps 303. The thread local heaps are grouped together and starts on address 304, which is referred to as TLH_ALLOCATION_START. By allocating only thread local heaps above the start address 0x4000000000 and below 0x8000000000 a pointer can easily be identified as a pointer to a thread local heap by checking only a single bit, for example by bitwise ANDing with 0x4000000000. This makes the write barrier code more efficient. Each trapped write is stored in the corresponding thread pointer buffer 305.

Each thread local heap 303 begins with a header that contains a pointer to the thread pointer buffer 305. The thread local heaps are aligned on addresses that are multiples of 512 kb. As soon as a pointer has been identified as a local heap pointer, bitwise ANDing the pointer with 0x7fff80000 will give the address to the thread local header and then easy access to the thread pointer buffer. A thread local heap also does not need to use its full allocated address space, but can instead use only parts of it rounded to the nearest page. With the help of the page fault optimizer 105, the read barriers can be implemented using hardware page faults that makes the read barriers much more efficient than software read barriers.

Figure 4:
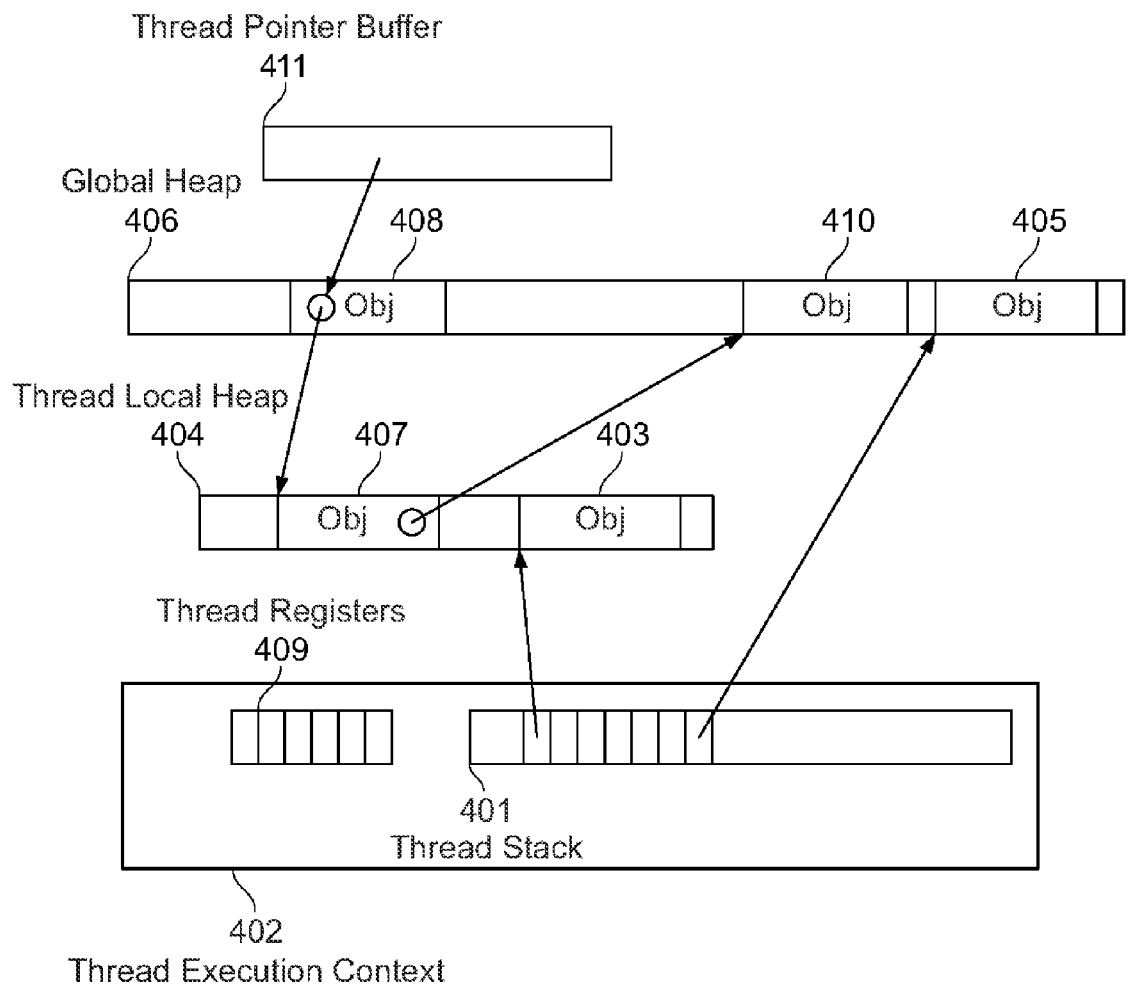
FIG. 4 shows a schematic of the memory layout of heaps, their objects and thread stacks in accordance with an embodiment.

FIG. 4 shows a schematic of the memory layout of heaps and data structures in accordance with an embodiment. As shown in FIG. 4, the thread stack 401 inside the thread execution context 402 contains a pointer to an object 403 in the thread local heap 404, it also contains a pointer to an object 405 in the global heap 406. An object 407 on the thread local heap is alive because it is referenced from object 408 on the global heap. Since neither the thread stack 401 nor the thread registers 409 inside the thread execution context 402, nor any other object on the thread local heap 404 has any pointer to object 407, the address of the pointer to object 407 must be recorded in the thread pointer buffer 411 and this is accomplished by the previously described write barriers. The thread pointer buffer is an efficient implementation of a map from an address of an object 407 in the thread local heap to a vector of several addresses of pointer locations in the global, where 408 contains one of these. Of course, if only the knowledge that object 407 is alive was needed, then the thread pointer buffer could point directly to object 407. But as further described below, since object 407 might need to be moved, the address of the pointer is needed to make sure the system can update it when a move eventually takes place. There is no extra complexity involved if object 407 points to a global object 410 because the thread local heaps are taken in account as roots when the global heap is garbage collected.

Figure 5:
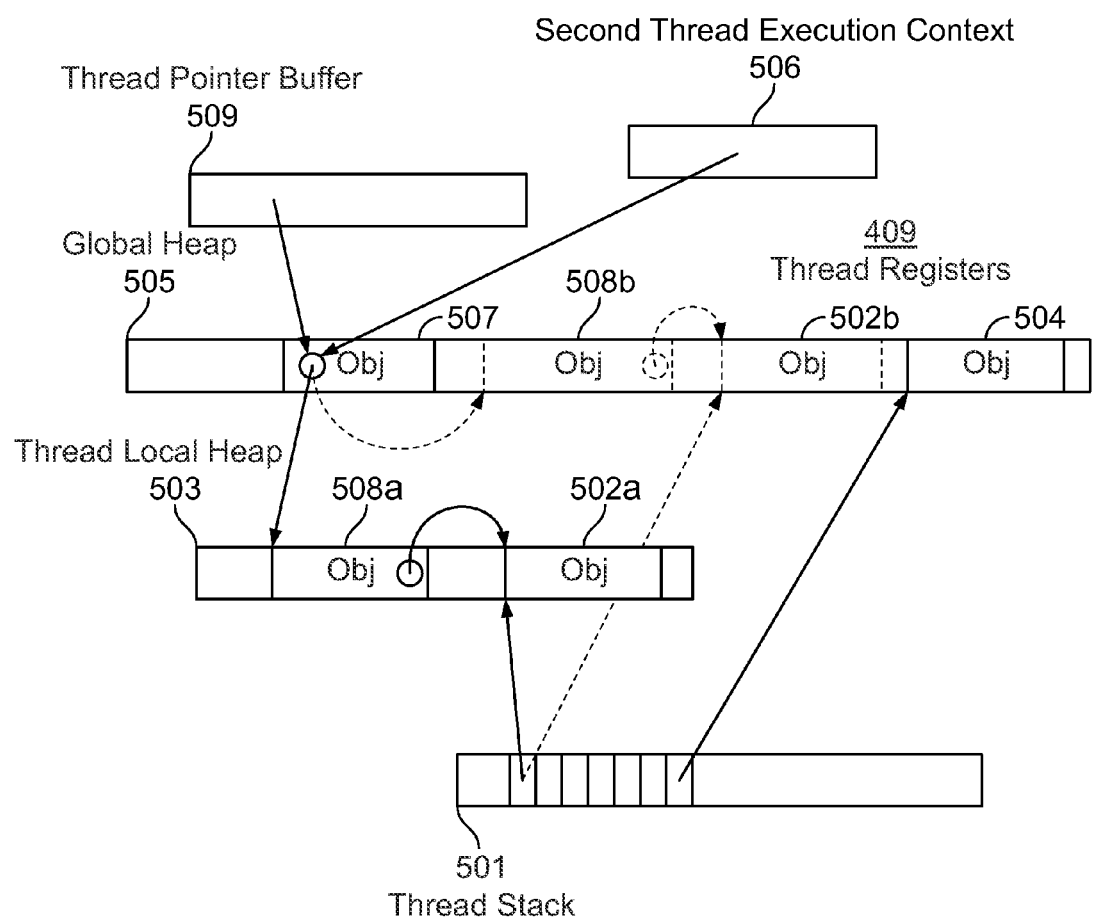
FIG. 5 shows a schematic of the changes to the memory layout of heaps, their objects and thread stacks in accordance with an embodiment, that takes place when an object is promoted from the thread local heap to the global heap, triggered when the object is accessed from a thread different from the thread that owns the thread local heap.

FIG. 5 shows a schematic of the changes to the memory layout of heaps, their objects and thread stacks in accordance with an embodiment, that takes place when an object is promoted from the thread local heap to the global heap, which in turn is triggered when the object is accessed from a second thread different from the thread that owns the thread local heap. As shown in FIG. 5, the thread stack 501 references an object 502a on the thread local heap 503 and an object 504 on the global heap 505. However when a second thread follows a pointer from its execution context 506 to object 507 and then to object 508a, there is an immediate danger that it will retain this pointer for a long time in its execution context or store it in its own local heap. This would violate the heap invariant and to prevent this, the object 508a must be promoted to the global heap 505 (e.g. the object is copied from the thread local heap to the global heap) and all references to object 508a must be updated to point to the new location 508b, in particular object 507. These references are found by using the thread pointer buffer 509. If object 508a points to other objects in the thread local heap, for example object 502a, then a decision has to be made whether object 502a should be promoted to 502b as well. It is not necessary to promote the object 502a. But if there is a high probability that the object 502b will be accessed within the near future, it should be promoted at the same time as 508a is promoted.

Page Fault Optimizer

In traditional operating systems, threads within a process share all memory alike. This means that if one thread can read a page, then all other threads within the same process can also read that page. Processes within the operating system, on the other hand, do not share memory by default. However there is nothing in currently available hardware that prevents threads from sharing some memory and not sharing other memory.

By extending an operating system with a page fault optimizer it is possible to use page faults as efficiently as possible to trap memory accesses between threads within a single process. The page fault optimizer should enable the JVM to mark pages as only readable by a single thread, all other accesses should generate a signal to a signal handler. In accordance with an embodiment, the system uses this possibility to mark the thread local heap as readable only by its owning thread. The signal handler is the promotion code that moves the object, to which access was attempted, to the global heap. It is important that the page fault optimizer has a very low overhead before calling the signal handler. This is not true for page fault handlers in current operating systems since page faults are assumed to either be errors (which occur very seldom), or virtual memory that needs to be swapped in from disk and which is limited by the slow disk anyway.

Read Barrier Details

It is not enough for a first thread to trap all read accesses to a second thread's local heap memory using page faults to maintain the heap invariant. For example a pointer can simply be copied from a field in a global object to a thread local object without touching the actual object that is pointed to. Therefore the byte code compiler needs to insert an extra load instruction to perform a dummy read from the object whose pointer is to be loaded. If an array of references is copied, using for example array copy, then a dummy read must be performed for each element in the array. A dummy read has a conditional setting to avoid dummy reads from address zero so as to avoid triggering the null pointer page fault whenever null pointers are copied.

Dummy reads are inserted by default whenever a pointer is loaded from an object field or from an array. A peephole optimizer then removes unnecessary reads where the next instruction is a read or a store to the object itself. This will remove the need for dummy reads for normal stores and reads to and from fields within the object. This will also remove the need for dummy reads for virtual function calls, since such a call requires a read from the object to acquire the address of the virtual table.

Write Barrier Details

In accordance with an embodiment, the three byte code instructions putfield, putstatic and aastore in Java byte code are translated into two different JRockit low level representations: store pointer in object field and store pointer in array. The write barrier should only trap if the stored pointer points to the thread local heap and the destination is located on the global heap. One way to perform this trap is to make sure each translation of these stores into native code must include the following native code. O1 is a variable that contains a pointer to the thread local object. O2 is a variable that contains a pointer to the global object in which we will store O1.

```
store O1 –> [O2 + offset]
xor O1, O2 –> tmp
and tmp, O1 –> tmp
test tmp, TLA_ALLOC_START
jz done
do_register_in_thread_pointer_buffer
done:
```

The above code will only trap if the referenced object's location O1 (local/global) is different from the destination location O2 (local/global) and if the referenced object's (O1) location is on a thread local heap. The heap invariant guarantees that O1 must be located on the thread's own heap and that the registration should happen inside the thread's own thread pointer buffer.

Fast Locking

The heap invariant guarantees that any object located on a thread local heap can only be accessed by a single thread. A thread that enters a synchronized function on an object that is thread local can ignore the expensive native compare and swap instruction (CAS) that is necessary to guarantee serialized access to memory in a multi cpu environment, it can instead use a normal store. O1 is a variable that contains a pointer to the thread local object that is to be locked. The locking code checks if the object is thread local simply by checking a single bit:

```
test O1, TLA_ALLOC_START
jnz local_object
do_lock_object_using_CAS
jmp done
local_object:
do_lock object_without_CAS
done:
```

Transaction Based Application Software

Many server applications have a thread pool and a request queue. A request is picked up by a thread which handles it. The thread then continues with the next request on the request queue. There is essentially no dependency between different request. If the application software can signal the JVM that a request has been processed and a thread local garbage collect is requested, then the thread local garbage collect can clear out the thread local heap almost completely since most of the working data set is no longer live. Remaining data is linked into common data structures on the global heap. The common case is that there is very little such data since the transaction often is registered directly in a database. Since the thread local garbage collect happens without pausing the other threads and between servicing two requests, this will make the server application almost pause-less, which in turn is a big performance gain.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a WebLogic or JRockit environment, other application servers, virtual machines, JVMs, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for optimistic creation of thread local objects in a virtual machine environment, comprising:
 a computer including a processor and a virtual machine for executing a software application;
 a memory space, for use by the virtual machine in storing software objects and pointers as part of the software application, wherein the memory space includes a global heap and a plurality of thread local heaps stored as pages therein;
 a page fault optimizer, which enables the virtual machine to
  associate separate threads within the software application process with separate pages in memory, for use by the threads in storing their thread local heaps, and
  mark particular pages storing particular thread local heaps as readable only by their associated threads, so that access to those particular pages and thread local heaps by other threads are detected as page faults and cause the virtual machine to generate a promotion signal;
 a heap maintaining logic that maintains the global heap and the plurality of thread local heaps in a state suitable for efficient garbage collecting, including
  maintaining a plurality of thread pointer buffers, including a separate thread pointer buffer for each thread, wherein, for each particular thread its thread pointer buffer contains pointers to all object variables located in the global heap that point to objects located inside that particular thread's local heap, and
  when it is determined, in response to a promotion signal from the virtual machine, that an object in a first thread local heap is accessed from a second, different, thread within the plurality of local threads, then
   copying that object from the first thread local heap to the global heap,
   determining, using the thread pointer buffer for the first thread local heap, all references to that object from the global heap, and
   modifying other objects that are stored in the global heap, so that all references in the global heap that previously pointed to that object's previous location in the first thread local heap, point instead to that object's new location in the global heap; and
 a garbage collector that collects the thread local heaps, including deleting copies of objects within the thread local heaps that have been promoted to the global heap.

2. The system of claim 1 wherein the heap maintaining logic maintains the global heap and the plurality of thread local heaps in a state suitable for efficient garbage collecting by ensuring that the thread local objects are not referenced from other thread execution contexts or other thread local heaps, including if a thread local object is determined as being accessed by one or more other threads, then
 promoting that object to the global heap,
 allowing the other threads to store, within their thread local heap or thread execution context, an address to the object as stored in the global heap, and
 allowing the thread local object to be garbage collected.

3. The system of claim 1 wherein the thread local heap is divided into a local nursery space and a local old space, and wherein objects are initially placed in the local nursery space, and during garbage collection are moved either to the local old space of the thread local heap, or if the object is being accessed by another thread then to the global heap.

4. The system of claim 1 wherein the software application can issue a command to the virtual machine to trigger the virtual machine to perform a thread local garbage collection.

5. The system of claim 1 wherein the step of determining a pointer to an object within the thread local heap which is stored either within a different thread local heap or a different thread execution context, and promoting that object from its thread local heap to the global heap, includes
 determining that a particular object is stored in a local heap associated with a first thread;
 determining that a second thread currently maintains a pointer from its execution context to the particular object, directly or via the global heap;
 promoting the particular object from the local heap to the global heap and updating all references to the particular object to point to its new location in the global heap; and
 determining whether to promote additional objects which are referenced by the particular object, to the global heap, at the same time, if there is a probability that those additional objects will be similarly accessed by the second or another thread in the near future.

6. The system of claim 1 wherein the garbage collector garbage collects the thread local heaps in parallel with stop-the-world pauses for the global heap.

7. A method for optimistic creation of thread local objects in a virtual machine environment, comprising the steps of:
 executing a software application at a computer including a processor and a virtual machine;
 storing software objects and pointers in a memory space as part of the software application and for use by the virtual machine, wherein the memory space includes a global heap and a plurality of thread local heaps stored as pages therein;
 monitoring accesses, using a page fault optimizer which enables the virtual machine to associate separate threads within the software application process with separate pages in memory, for use by the threads in storing their thread local heaps, and mark particular pages storing particular thread local heaps as readable only by their associated threads, so that access to those particular pages and thread local heaps by other threads are detected as page faults and cause the virtual machine to generate a promotion signal;
 maintaining the global heap and the plurality of thread local heaps in a state suitable for efficient garbage collecting, including
  maintaining a plurality of thread pointer buffers, including a separate thread pointer buffer for each thread, wherein, for each particular thread its thread pointer buffer contains pointers to all object variables located in the global heap that point to objects located inside that particular thread's local heap, and
  when it is determined, in response to a promotion signal from the virtual machine, that an object in a first thread local heap is accessed from a second, different, thread within the plurality of local threads, then
   copying that object from the first thread local heap to the global heap,
   determining, using the thread pointer buffer for the first thread local heap, all references to that object from the global heap, and
   modifying other objects that are stored in the global heap, so that all references in the global heap that previously pointed to that object's previous location in the first thread local heap, point instead to that object's new location in the global heap; and garbage collecting the thread local heaps, including deleting copies of objects within the thread local heaps that have been promoted to the global heap.

8. The method of claim 7 wherein the step of maintaining includes maintaining the global heap and the plurality of thread local heaps in a state suitable for efficient garbage collecting by ensuring that the thread local objects are not referenced from other thread execution contexts or other thread local heaps, including if a thread local object is determined as being accessed by one or more other threads, then
promoting that object to the global heap,
allowing the other threads to store, within their thread local heap or thread execution context, an address to the object as stored in the global heap, and
allowing the thread local object to be garbage collected.

9. The method of claim 7 wherein the thread local heap is divided into a local nursery space and a local old space, and wherein objects are initially placed in the local nursery space, and during garbage collection are moved either to the local old space of the thread local heap, or if the object is being accessed by another thread then to the global heap.

10. The method of claim 7 wherein the software application can issue a command to the virtual machine to trigger the virtual machine to perform a thread local garbage collection.

11. The method of claim 7 wherein the step of determining a pointer to an object within the thread local heap which is stored either within a different thread local heap or a different thread execution context, and promoting that object from its thread local heap to the global heap, includes
determining that a particular object is stored in a local heap associated with a first thread;
determining that a second thread currently maintains a pointer from its execution context to the particular object, directly or via the global heap;
promoting the particular object from the local heap to the global heap and updating all references to the particular object to point to its new location in the global heap; and
determining whether to promote additional objects which are referenced by the particular object, to the global heap, at the same time, if there is a probability that those additional objects will be similarly accessed by the second or another thread in the near future.

12. The method of claim 7 wherein the step of garbage collecting includes garbage collecting the thread local heaps in parallel with stop-the-world pauses for the global heap.

13. A non-transitory storage medium including instructions stored thereon, which when executed by a computer cause the computer to perform the steps of:
executing a software application at a computer including a processor and a virtual machine;
storing software objects and pointers in a memory space as part of the software application and for use by the virtual machine, wherein the memory space includes a global heap and a plurality of thread local heaps stored as pages therein;
monitoring accesses, using a page fault optimizer which enables the virtual machine to associate separate threads within the software application process with separate pages in memory, for use by the threads in storing their thread local heaps, and mark particular pages storing particular thread local heaps as readable only by their associated threads, so that access to those particular pages and thread local heaps by other threads are detected as page faults and cause the virtual machine to generate a promotion signal;
maintaining the global heap and the plurality of thread local heaps in a state suitable for efficient garbage collecting, including
maintaining a plurality of thread pointer buffers, including a separate thread pointer buffer for each thread,
wherein, for each particular thread its thread pointer buffer contains pointers to all object variables located in the global heap that point to objects located inside that particular thread's local heap, and
when it is determined, in response to a promotion signal from the virtual machine, that an object in a first thread local heap is accessed from a second, different, thread within the plurality of local threads, then
copying that object from the first thread local heap to the global heap,
determining, using the thread pointer buffer for the first thread local heap, all references to that object from the global heap, and
modifying other objects that are stored in the global heap, so that all references in the global heap that previously pointed to that object's previous location in the first thread local heap, point instead to that object's new location in the global heap; and
garbage collecting the thread local heaps, including deleting copies of objects within the thread local heaps that have been promoted to the global heap.

14. The non-transitory storage medium of claim 13 wherein the step of maintaining includes maintaining the global heap and the plurality of thread local heaps in a state suitable for efficient garbage collecting by ensuring that the thread local objects are not referenced from other thread execution contexts or other thread local heaps, including if a thread local object is determined as being accessed by one or more other threads, then
promoting that object to the global heap,
allowing the other threads to store, within their thread local heap or thread execution context, an address to the object as stored in the global heap, and
allowing the thread local object to be garbage collected.

15. The non-transitory storage medium of claim 13 wherein the thread local heap is divided into a local nursery space and a local old space, and wherein objects are initially placed in the local nursery space, and during garbage collection are moved either to the local old space of the thread local heap, or if the object is being accessed by another thread then to the global heap.

16. The non-transitory storage medium of claim 13 wherein the software application can issue a command to the virtual machine to trigger the virtual machine to perform a thread local garbage collection.

17. The non-transitory storage medium of claim 13 wherein the step of determining a pointer to an object within the thread local heap which is stored either within a different thread local heap or a different thread execution context, and promoting that object from its thread local heap to the global heap, includes determining that a particular object is stored in a local heap associated with a first thread;
determining that a second thread currently maintains a pointer from its execution context to the particular object, directly or via the global heap;
promoting the particular object from the local heap to the global heap and updating all references to the particular object to point to its new location in the global heap; and
determining whether to promote additional objects which are referenced by the particular object, to the global heap, at the same time, if there is a probability that those additional objects will be similarly accessed by the second or another thread in the near future.

18. The non-transitory storage medium of claim 13 wherein the step of garbage collecting includes garbage collecting the thread local heaps in parallel with stop-the-world pauses for the global heap.

* * * * *